Nov. 24, 1925.  F. H. BEYEA  1,562,677

BEAD FOR PNEUMATIC TIRES

Filed Sept. 8, 1921

Inventor
Frank H. Beyea
By
Atty.

Patented Nov. 24, 1925.

1,562,677

UNITED STATES PATENT OFFICE.

FRANK H. BEYEA, OF AKRON, OHIO, ASSIGNOR TO JOHN R. GAMMETER, OF AKRON, OHIO.

BEAD FOR PNEUMATIC TIRES.

Application filed September 8, 1921. Serial No. 499,306.

*To all whom it may concern:*

Be it known that I, FRANK H. BEYEA, a citizen of the United States, residing at Akron, in the county of Summit and State of Ohio, have invented certain new and useful Improvements in Beads for Pneumatic Tires, of which the following is a specification.

This invention relates particularly to the manufacture of beads of the inextensible type for pneumatic tires, and it is the purpose of the present invention to overcome some of the disadvantages attendant upon the ordinary straight-side bead as now used by tire manufacturers, but while my invention is especially adapted for the purpose, other and similar uses may be made of the structure of this invention.

The usual tire bead comprises an inextensible filling strip which is placed between the plies of a pneumatic tire at the edges thereof and provides the necessary inextensibility for that portion of the tire to prevent it leaving the upturned flanges on the rim. The inextensibility of the bead is obtained by embedding within it, a metallic strip or strips which are unstretchable. In certain types of tires a single cable or several cables are used and the fabric is looped about the cables. In other types of tires a filling piece is used to fill out the bead to an approximately triangular shape, which is subsequently molded or partially cured prior to its incorporation in the tire carcass during the building of the tire. The filling substance used to fill out the triangular bead is usually a hard rubber composition or rubber and fibrous material and the bead is given a preliminary vulcanization to partially cure and shape it. After the tire is built, the subsequent vulcanization, given during the curing of the tire, completes the vulcanization of the bead.

The heat of vulcanization of the tire causes the rubber contained in the bead, even in the case of a hard rubber compound, to soften, and in the curing of tires by the use of internal pressure, either with an air bag or by means of fluid pressure admitted directly to the interior of the tire the "toe" or lower inner edge of the bead is liable to be rounded off. It is advisable to have the toe of the bead come to a sharp point to make a well finished tire.

It is, therefore, the purpose of my invention to construct a triangular or similarly shaped bead, which will retain its shape through the vulcanizing operation, and I have for this reason substituted for the hard rubber or rubber composition of the filler of the bead, a substance which will withstand the temperature of vulcanization and will yet have the other qualities essential to a tire bead of the variety specified.

In the drawings accompanying this application, there are shown certain forms and embodiments of my invention, but it will be understood that I am not limited to the exact form shown, as variations and modifications may be permitted within the scope of the invention.

Figure 1:
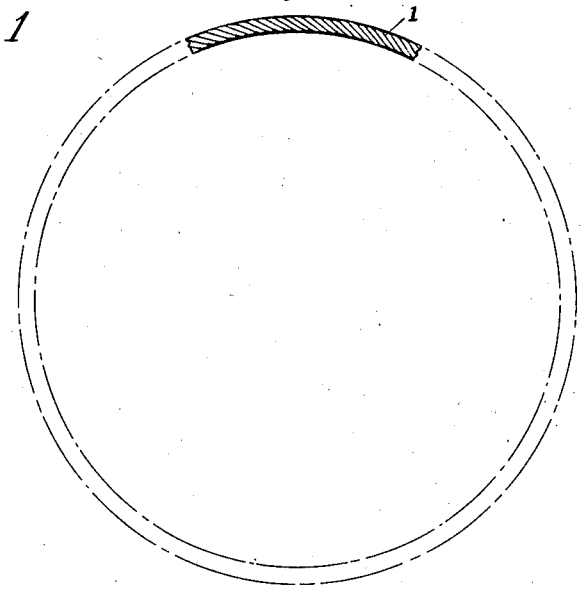
Fig. 1 shows the bead core or gromet of a well known type which is used to give the requisite inextensibility to the bead.

In the bead structure comprising one embodiment of my invention, I make use of any one of the several forms of inextensible wire bead cores or gromets now in use. One type of the bead core is shown in the drawings, in which 1 represents a cable hoop or ring made of the usual spirally wound wire. In place of this form of gromet I may substitute any other form, such, for example, as the well known braided wire tape or belt.

The bead core is then embedded or incased in a substance having the qualities mentioned, which should be able to withstand the heat of vulcanization without melting or softening, and which should be sufficiently flexible and non-fragile to be subjected to the usage which is given to a tire bead without breaking or attaining a set.

I have found that lead possesses the desirable properties mentioned, and may be used for the purpose, although my invention is not limited to the use of lead, specifically, as other substances may be used for this purpose and still contain my invention.

Figure 2:
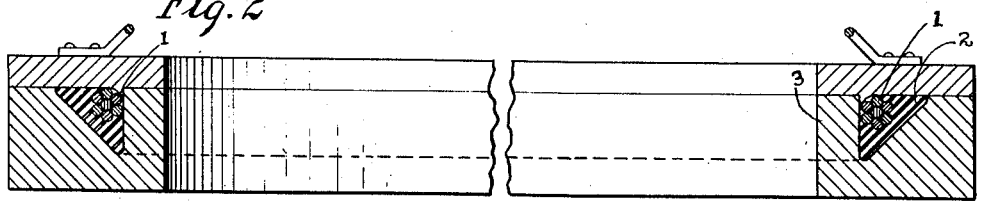
Fig. 2 shows one method of forming a bead within the scope of my invention.
Figure 3:
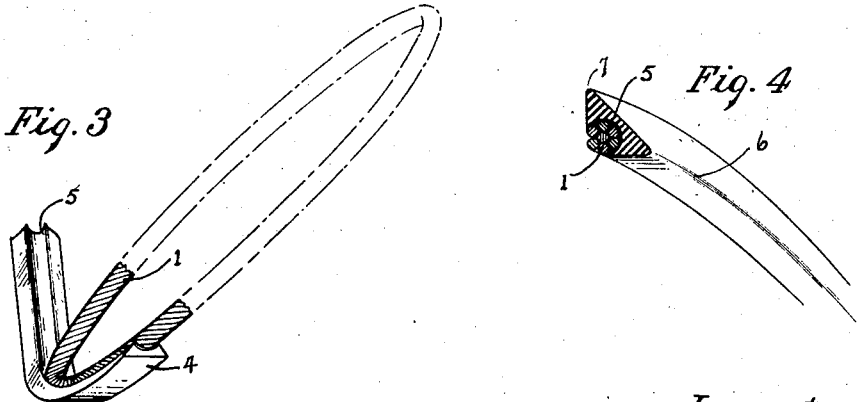
Fig. 3 is a perspective view of an alternative method of forming the bead.
Figure 4:
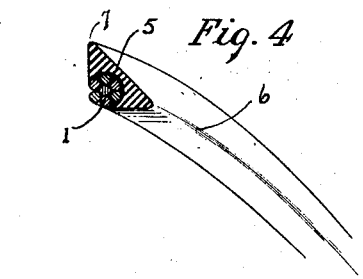
Fig. 4 is a view showing a section across the completed bead.

The lead may be applied by molding it about the bead core as shown in Fig. 2 in which the lead filler is indicated by the numeral 2 and the mold by the numeral 3. The lead may also be applied by shaping, by extruding or squirting a lead filler of the proper shape, and after the required length has been cut, applying the strip of lead about the bead core. This method is shown in Fig. 3 in which the lead filler is shown at 4. A coating of solder or similar fluxing material 5 may be applied to the inner surface of the filler where it fits about the bead core, which solder is heated sufficiently to flow into the interstices of the bead core and unite the filler thereto as is shown in Fig. 4.

Where a cable bead core is used, as shown in the drawings, this may be advantageously seated at the heel of the bead. The toe of the bead is indicated at 6 and the upper edge at 7. While this shape of inextensible bead is the one in almost universal use, the invention is not limited to this shape of bead.

I believe that I am the first to propose the use of a filling substance for a bead which has the property of retaining its shape during the curing operation. By the use of such a bead the well pointed toe, or inner edge of the tire is maintained during the curing operation and a better tire is the result, the previous rounding off of the bead under internal fluid pressure during the curing being prevented. In addition to these advantages the new form of bead may be made more economically than the old forms of bead, both from the cost of the material entering into the bead and the saving of labor in preparing the bead for incorporation in the tire carcass.

Claims:

1. A bead comprising an inextensible core and a filling of material which will not soften at the temperature of vulcanization.

2. A bead comprising an inextensible wire core and a filling substance completing the bead to approximately triangular shape composed of metal which will not soften at the temperature of vulcanization.

3. A bead structure which is approximately triangular in cross-section, inextensible, and which will not soften at the temperature of vulcanization.

4. A bead structure which is approximately triangular in cross-section, inextensible, flexible, and which will not soften or flow at the temperature of vulcanization.

5. A bead structure, the toe of which is composed of lead.

6. A solid bead structure composed entirely of metallic substances.

7. An inextensible bead structure of triangular cross-section which is composed entirely of metallic substances.

8. A bead structure comprising a wire core and a filler of a flexible metallic substance.

9. A bead structure comprising a wire core, and a filler extending to the toe thereof, said filler being composed of a flexible metallic substance.

10. A bead structure comprising a cable of wire located at the heel of the bead and a filler completing an approximately triangular cross-section for the bead, said filler containing lead.

11. A bead structure comprising a cable of wire located at the heel of the bead and a filler extending from the cable and filling the toe of the bead, said filler being composed of a substance which is flexible and will not soften at the temperature of vulcanization.

12. A bead structure comprising an inextensible metallic core and a filling of lead about said core and fused thereon.

13. A bead structure comprising an inextensible metallic core and a filling of lead about said core and fused thereon, the filling extending from the core into the toe of the bead.

14. A bead structure comprising a wire cable seated at the heel of the bead and a solid lead filler bringing said bead to a triangular cross-section.

15. In a bead construction, an endless metallic cable and a filler having two wings and a centrally located trough, the cable seated in the trough with the two wings wrapped about the cable.

FRANK H. BEYEA.